(12) United States Patent
Eichler

(10) Patent No.: US 9,609,606 B2
(45) Date of Patent: Mar. 28, 2017

(54) METHOD FOR INTEGRATING NETWORK SUBSCRIBERS INTO AN AD-HOC NETWORK AND AN ASSOCIATED AD-HOC NETWORK

(71) Applicant: Rohde & Schwarz GmbH & Co. KG, Munich (DE)

(72) Inventor: Stephan Eichler, Munich (DE)

(73) Assignee: Rohde & Schwarze GmbH & Co. KG, Munich (DE)

( * ) Notice: Subject to any disclaimer, the term of this patent is extended or adjusted under 35 U.S.C. 154(b) by 208 days.

(21) Appl. No.: 14/390,389

(22) PCT Filed: Mar. 26, 2013

(86) PCT No.: PCT/EP2013/056404
§ 371 (c)(1),
(2) Date: Oct. 2, 2014

(87) PCT Pub. No.: WO2013/149886
PCT Pub. Date: Oct. 10, 2013

(65) Prior Publication Data
US 2015/0043559 A1 Feb. 12, 2015

(30) Foreign Application Priority Data
Apr. 2, 2012 (DE) .......... 10 2012 205 355

(51) Int. Cl.
*H04W 56/00* (2009.01)
*H04W 84/18* (2009.01)
*H04W 8/00* (2009.01)

(52) U.S. Cl.
CPC ....... *H04W 56/0005* (2013.01); *H04W 84/18* (2013.01); *H04W 8/005* (2013.01); *H04W 56/002* (2013.01)

(58) Field of Classification Search
None
See application file for complete search history.

(56) References Cited

U.S. PATENT DOCUMENTS

| 2004/0003111 A1 | 1/2004 | Maeda et al. |
| 2004/0009749 A1* | 1/2004 | Arazi ............ H04W 36/08 455/41.2 |

(Continued)

FOREIGN PATENT DOCUMENTS

| EP | 2034629 A1 | 3/2009 |
| WO | WO2011154911 A1 | 12/2011 |

OTHER PUBLICATIONS

"International Preliminary Report on Patentability (translation)", PCT/EP2013/056404, Oct. 16, 2014.

*Primary Examiner* — Marcus R Smith
*Assistant Examiner* — Gautam Sharma
(74) *Attorney, Agent, or Firm* — Potomac Technology Law, LLC

(57) ABSTRACT

A method for integrating network subscribers into a time-synchronized ad-hoc network forms individual clusters in each case of regionally adjacent network subscribers and implements a time synchronization of the network subscribers within each cluster. Following this, a network subscriber at the periphery of each cluster is selected in order to identify at least one network subscriber to be integrated into the respective cluster. Finally, the subscribers of the respective cluster are time-synchronized with every identified network subscriber.

17 Claims, 3 Drawing Sheets

(56) References Cited

U.S. PATENT DOCUMENTS

| | | | |
|---|---|---|---|
| 2004/0042417 A1 | 3/2004 | Kennedy | |
| 2004/0110508 A1* | 6/2004 | Haartsen | H04L 5/0005 |
| | | | 455/445 |
| 2005/0188062 A1 | 8/2005 | Li et al. | |
| 2006/0165024 A1* | 7/2006 | Iwami | H04W 48/08 |
| | | | 370/315 |
| 2006/0171387 A1* | 8/2006 | Kang | H04L 29/12264 |
| | | | 370/389 |
| 2007/0127528 A1* | 6/2007 | Beyer | H04B 7/2662 |
| | | | 370/516 |
| 2007/0223431 A1* | 9/2007 | Jaakkola | H04W 48/20 |
| | | | 370/338 |
| 2008/0240073 A1 | 10/2008 | Pun et al. | |
| 2009/0103501 A1* | 4/2009 | Farrag | H04W 74/02 |
| | | | 370/337 |
| 2009/0252134 A1* | 10/2009 | Schlicht | H04L 1/0015 |
| | | | 370/338 |
| 2010/0103866 A1* | 4/2010 | Reichman | H04W 72/02 |
| | | | 370/316 |
| 2011/0222515 A1 | 9/2011 | Wang et al. | |
| 2012/0027030 A1* | 2/2012 | Naito | G01V 1/22 |
| | | | 370/503 |
| 2015/0043559 A1* | 2/2015 | Eichler | H04W 56/0005 |
| | | | 370/338 |

* cited by examiner

METHOD FOR INTEGRATING NETWORK SUBSCRIBERS INTO AN AD-HOC NETWORK AND AN ASSOCIATED AD-HOC NETWORK

FIELD

The invention relates to a method for integrating network subscribers into a time-synchronized ad-hoc network and an associated ad-hoc network.

BACKGROUND

Modern radio networks are realized as mobile ad-hoc networks. Ad-hoc networks do not provide an infrastructure for the transmission of voice and data traffic between the individual network subscribers. Instead, the individual network subscribers of an ad-hoc network organize the respective transmission of voice and data traffic themselves.

One quite substantial task in the organization and operation of an ad-hoc network is the time synchronization of the individual network subscribers. In this context, a frequency-hop method is used in order to prevent any disturbance of the transmission traffic. Accordingly, the carrier frequency of the transmission is modified within a given time course according to a given frequency pattern. The frequency pattern of the carrier frequency against time is known to the individual network subscribers of an ad-hoc network. To ensure that all network subscribers of an ad-hoc network switch over from one carrier frequency to the next carrier frequency of the frequency pattern at the same time, they require an identical reference time. For this purpose, a time synchronization between all of the network subscribers of the ad-hoc network is implemented within a given time grid.

A device and a method for time synchronization between the network subscribers of an ad-hoc network are known from WO 2011/154911 A1. In this context, the entire ad-hoc network is subdivided into individual groupings—so-called clusters—comprising regionally adjacent network subscribers which are positioned within the mutual transmission and/or reception range. In this case, both the transmission of payload data and also the time synchronization within a cluster are implemented through an individual transmission process (a so-called one-hop transmission). Alongside this intra-time-synchronization within the individual clusters, a time synchronization within the overall ad-hoc network is implemented via an inter-time-synchronization between respectively adjacent clusters.

In order to minimize or prevent any disturbance of the time synchronization, the continual time synchronization within one cluster is implemented in each case by alternating network subscribers of a cluster which are positioned in the transmission and/or reception range of all of the other network subscribers of the cluster. Accordingly, a typically encoded synchronization bit pattern known to all of the network subscribers of the ad-hoc network is transmitted to the other network subscribers of the cluster. The other network subscribers of the cluster accordingly synchronize their internal reference time with the internal reference time of the network subscriber transmitting the synchronization bit pattern by comparing the reception time of the synchronization bit pattern measured at their previous internal reference time, the time since the common activation of all network subscribers of the cluster measured at their previous internal reference time and the transmission time of the synchronization bit pattern stored in the synchronization bit pattern and measured at the internal reference time of the transmitting network subscriber.

In mobile ad-hoc networks, the positions of the individual network subscribers change constantly. Accordingly, for every network subscriber, the respective, regionally adjacent network subscribers of the mobile ad-hoc network, especially of the regionally adjacent network subscribers within the cluster, change over time. For this reason, the communication of the voice and/or data transmission—so-called routing—between the transmitting network subscriber and the associated receiving network subscriber in an ad-hoc network must not only be continually matched, but the composition of the cluster comprising constantly changing network subscribers and the time synchronization between the constantly changing network subscribers within a cluster must also be continually matched.

What is needed, therefore, is an approach for integrating new network subscribers into existing time-synchronized clusters of a mobile ad-hoc network and to provide the time synchronization of the network subscriber integrated into the cluster with the other network subscribers of the cluster and to provide a correspondingly designed mobile ad-hoc network.

SUMMARY

Embodiments of the present invention advantageously address the foregoing requirements and needs, as well as others, by providing an approach for integrating new network subscribers into existing time-synchronized clusters of a mobile ad-hoc network and to provide the time synchronization of the network subscriber integrated into the cluster with the other network subscribers of the cluster and to provide a correspondingly designed mobile ad-hoc network.

Since the organization of the operation of a cluster, especially for the time synchronization within a cluster, the case of removing a network subscriber from the cluster is unproblematic by comparison with the case of integrating a network subscriber into a cluster, only the case of integrating a network subscriber into a cluster will be considered in the following section.

According to example embodiments of the present invention, on the basis of the clusters formed in a mobile ad-hoc network from respectively regionally adjacent network subscribers and the time synchronization of all network subscribers in each cluster, one network subscriber selected in each cluster, which is positioned at the periphery of the respective cluster, determines the network subscribers to be integrated into the respective cluster. By way of example, by selecting a network subscriber at the periphery of the respective cluster, it is possible to identify the maximum number of potential network subscribers to be integrated into the respective cluster. The network subscribers identified for integration are then time-synchronized with the network subscribers of the respective cluster. By way of further example, identification of network subscribers to be integrated into the respective cluster may be repeated within a given time intervals, whereas a different network subscriber of the respective cluster is preferably selected for identification in each case.

By way of example, the network subscribers implementing the identification of network subscribers to be integrated into the respective cluster are selected in such a manner that they are disposed maximally within the transmission and/or reception range of a previously specified number of network subscribers which belong to a cluster time-synchronized with the ad-hoc network, and respectively that they are not disposed in the transmission and/or reception range of any network subscriber which belongs to a cluster time-synchronized with the ad-hoc network. Otherwise, it must be anticipated with a high degree of probability that all of the network subscribers disposed in the transmission and/or reception range of the selected network subscriber are already integrated in a cluster time-synchronized with the ad-hoc network, and accordingly, for the selected network subscriber, the identification of a network subscriber to be integrated into its own cluster is improbable. The knowledge required for this purpose regarding the network subscribers disposed in the immediate regional proximity of a network subscriber of a mobile ad-hoc network is constantly updated with a proactive routing method.

By way of further example, to prevent the transmission efficiency in a mobile ad-hoc network from being unnecessarily impaired by the time synchronization and to prevent the time synchronization from being disturbed by a third party, the time synchronization may be implemented within individual, first time intervals, which each provide a constant, minimum duration and are spaced from one another with a statistically fluctuating time spacing.

By way of further example, the time synchronization within a cluster may be implemented by a network subscriber of the cluster which is positioned in the transmission and reception range of all of the other network subscribers, in order to achieve availability and therefore a common time synchronization of all network subscribers of the respective cluster. For the time synchronization, the network subscriber transmits information for the time synchronization in a first time interval which is known to all of the network subscribers of the ad-hoc network.

By way of further example, to avoid any unnecessary impairment of the transmission efficiency in the ad-hoc network, the time synchronization within a cluster of network subscribers is preferably suspended so long as the number of network subscribers within the respective cluster does not change.

In accordance with a first example embodiment of the invention, the network subscriber selected in the respective cluster identifies an individual network subscriber which is positioned in the transmission and/or reception range of the selected network subscriber and intends to join the ad-hoc network.

In accordance with a second example embodiment of the invention, the selected network subscriber in the respective cluster identifies an entire cluster of mutually time-synchronized network subscribers which intends to join the ad-hoc network, and which provides a network subscriber within the transmission and/or reception range of the selected network subscriber of the cluster time-synchronized with the ad-hoc network.

In accordance with an example embodiment that can be realized with the foregoing first example embodiment or foregoing second example embodiment, the search for an individual network subscriber or for a cluster of network subscribers time-synchronized with one another, which intend/s to join the cluster time-synchronized with the ad-hoc network, may be implemented by the selected network subscriber of the respective cluster time-synchronized with the ad-hoc network.

By way of example, in the foregoing first example embodiment the selected network subscriber transmits information searching for a network subscriber to be integrated. The identification of the network subscriber to be integrated in the respective cluster time-synchronized with the ad-hoc network is completed with the reception of the acknowledgement of the information searching for a network subscriber to be integrated which the network subscriber with the intention of integrating into the ad-hoc network transmits back.

By way of further example, in the foregoing second example embodiment, the selected network subscriber transmits information searching for a network subscriber to be integrated. The identification of the cluster, which intends to join the respective cluster time-synchronized with the ad-hoc network is concluded with the reception of the acknowledgement of the information searching for a network subscriber to be integrated, which the network subscriber of the cluster with the intention of integrating into the ad-hoc network positioned in the transmission and/or reception range of the selected network subscriber transmits back.

In accordance with a further example embodiment that can also be realized with the foregoing first example embodiment or foregoing second example embodiment, the search for a cluster time-synchronized with the ad-hoc network, which an individual network subscriber or a cluster of mutually time-synchronized network subscribers intends to join, may be implemented by the single network subscriber or a network subscriber associated with the cluster of mutually time-synchronized network subscribers which is positioned respectively in the transmission and/or reception range of the selected network subscriber of the respective cluster time-synchronized with the ad-hoc network.

By way of example, the individual network subscriber or network subscriber of a cluster of mutually time-synchronized network subscribers positioned in the transmission and/or reception range of a selected network subscriber of a cluster time-synchronized with the ad-hoc network transmits information searching for a time-synchronized cluster in order to integrate into a cluster time-synchronized with the ad-hoc network. The identification of the individual network subscriber or of the cluster of mutually time-synchronized network subscribers which intend to integrate into the respective cluster time-synchronized with the ad-hoc network is concluded with the reception of the information searching for a time-synchronized cluster and a subsequent acknowledgement of this received information by the selected network subscriber of the respective cluster.

By way of further example, the transmission of the information searching for a network subscriber to be integrated, the information searching for a time-synchronized cluster and the acknowledgement of this information may be implemented in second time intervals provided for this purpose, which each comprise a consistent, minimum possible duration with regard to an optimized transmission efficiency and with regard to a minimized reconnaissance or disturbance of the integration of network subscribers into the ad-hoc network by any unauthorized third party, and are repeated in a time cycle considerably longer than the cycle of the time synchronization.

Through the integration of new network subscribers into existing clusters of the ad-hoc network, clusters of networks can arise, which do not provide an individual network subscriber which has a direct transmission connection (so-called one-hop transmission) with every other network subscriber of the newly formed cluster. In this case, in order to enable time synchronization of all network subscribers of the newly formed cluster arising in this manner, in accordance with example embodiments, the newly formed cluster may be divided into several sub-clusters, which each provide at least one network subscriber which has a direct transmission connection with every other network subscriber of the accordingly divided cluster and can therefore realize a time synchronization with the other network subscribers of the divided cluster.

In accordance with further example embodiments, the network subscribers newly integrated into a cluster may be time-synchronized directly or after an optionally implemented division of the cluster newly formed through integration with the other network subscribers of the newly formed, divided or undivided cluster by a network subscriber with a direct transmission connection with all of the subscribers of the newly formed divided or undivided cluster.

BRIEF DESCRIPTION OF THE DRAWINGS

Various example of the present invention are explained in detail below by way of example with reference to the drawings. The figures of the drawings show.

DETAILED DESCRIPTION

Figure 1:
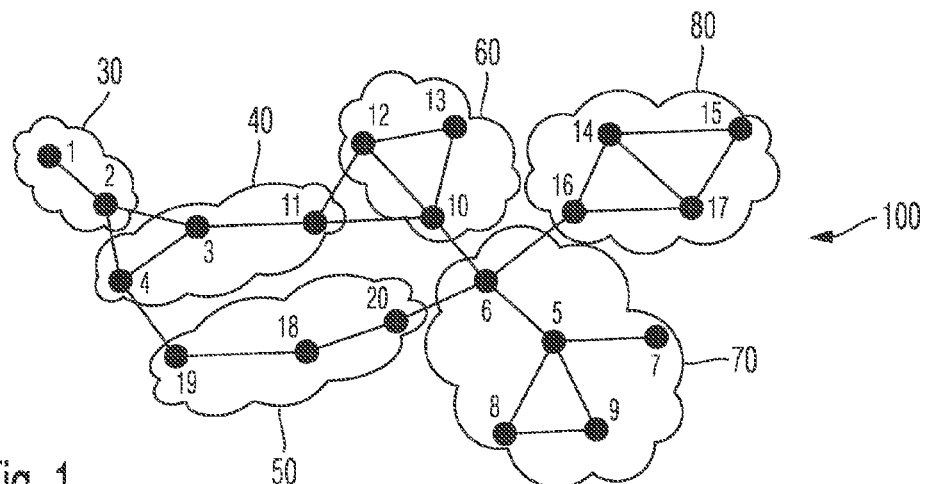
FIG. 1 illustrates a mobile ad-hoc network subdivided into several clusters, in accordance with example embodiments of the present invention.
Figure 2A:
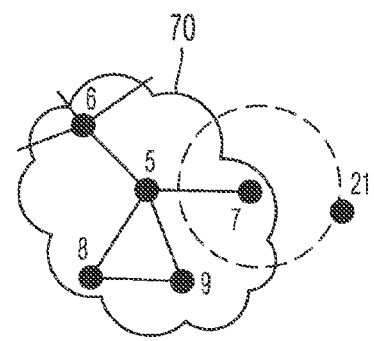
FIG. 2A illustrates a cluster of a mobile ad-hoc network and of a network subscriber to be integrated into the cluster, in accordance with example embodiments of the present invention.
Figure 2B:
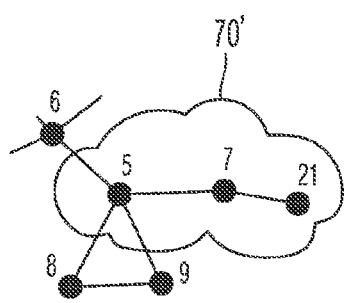
FIG. 2B illustrates a cluster of a mobile ad-hoc network and of the network subscriber of FIG. 2A after being integrated into the cluster, in accordance with example embodiments of the present invention.
Figure 3A:
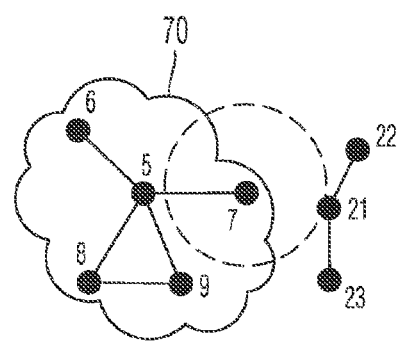
FIG. 3A illustrates a cluster of a mobile ad-hoc network and of a further cluster to be integrated into the cluster, in accordance with example embodiments of the present invention.
Figure 3B:
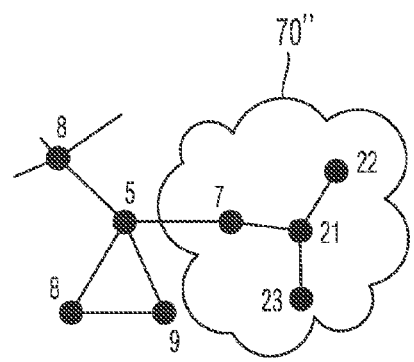
FIG. 3B illustrates a cluster of a mobile ad-hoc network and of the further cluster of FIG. 3A after being integrated into the cluster, in accordance with example embodiments of the present invention.
Figure 4:
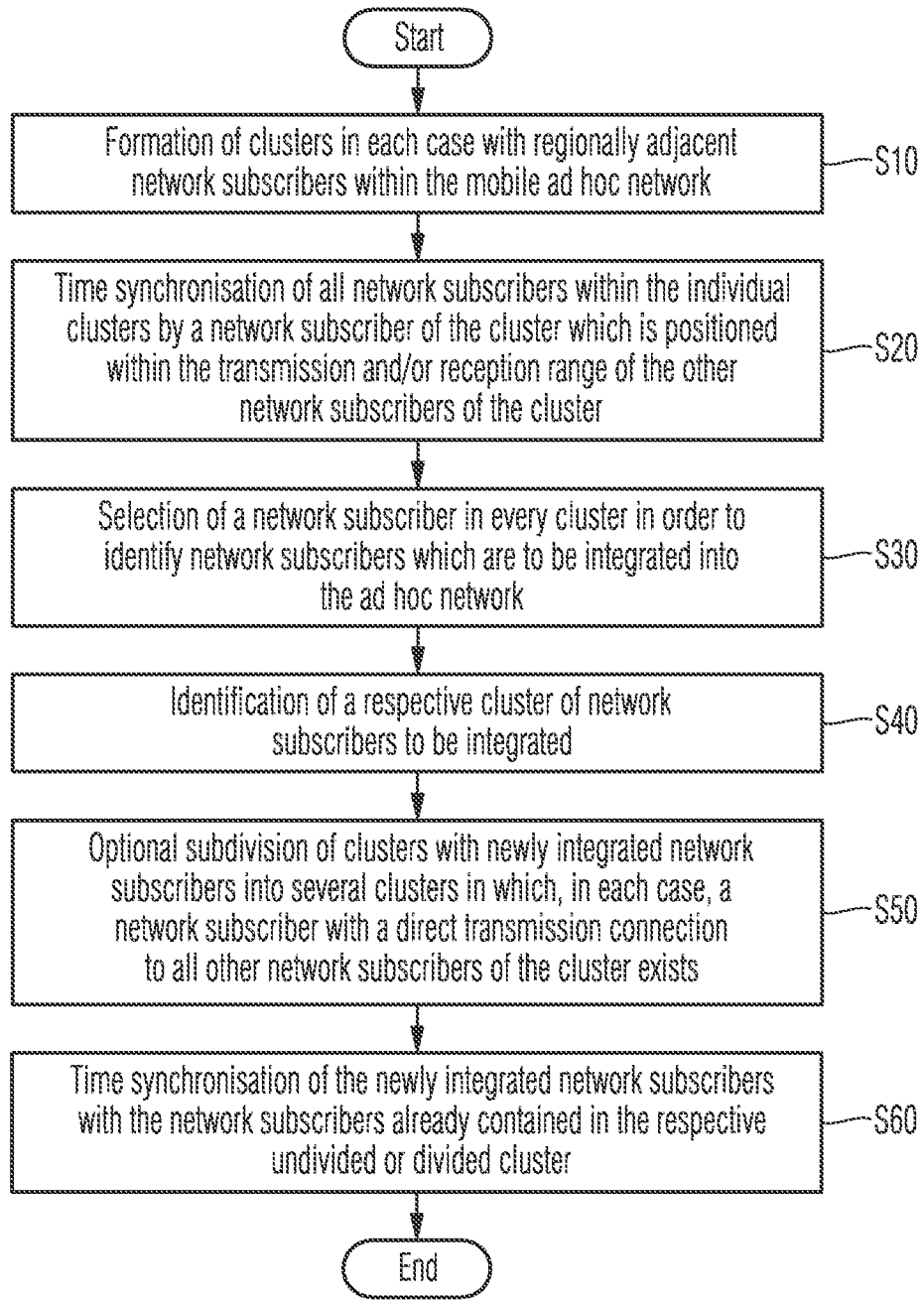
FIG. 4 illustrates a flow diagram of a method for integrating network subscribers into a time-synchronized ad-hoc network, in accordance with an example embodiment of the present invention.

An approach for integrating new network subscribers into existing time-synchronized clusters of a mobile ad-hoc network and to provide the time synchronization of the network subscriber integrated into the cluster with the other network subscribers of the cluster and to provide a correspondingly designed mobile ad-hoc network, is described The approach is described on the basis of the flow diagram in FIG. 4 and in the context of the associated ad-hoc network of FIG. 1, also taking into consideration FIGS. 2A, 2B, 3A and 3B:

With reference to FIG. 4, in the first method step S10 of the method according to example embodiments of the invention as shown in FIG. 1, groupings —so-called clusters— 30, 40, 50, 60, 70 and 80, in each case of regionally adjacent network subscribers 1, 2, 3, . . . , 18, 19 and 20 are formed in an ad-hoc network 100 which, at a given time, comprises a given number of network subscribers 1, 2, 3, . . . , 18, 19 and 20—for example, mobile radio devices which exchange voice and/or data with one another.

By way of example, the formation of the clusters 30, 40, 50, 60, 70 and 80 may be implemented in such a manner that a data transmission with the other network subscribers of the respective cluster can be implemented in an individual transmission step—a so-called one-hop transmission—via a central network subscriber of the cluster—in FIG. 1 the network subscriber 1 or 2 in cluster 30, the network subscriber 3 in cluster 40, the network subscriber 18 in cluster 50, the network subscriber 10, 12 or 13 in cluster 60, the network subscriber 5 in cluster 70 and the network subscriber 14 or 17 in cluster 80.

The knowledge about the topology of the ad-hoc network and accordingly about the relative positions of the individual network subscribers in the ad-hoc network, which is available to every network subscriber of the ad-hoc network within the framework of a proactive routing method, can be used for the formation of the individual clusters. Typically, one network subscriber which is not time-synchronized at the initialization time of the ad-hoc network with any other network subscriber of the ad-hoc network and is therefore not yet integrated in a cluster of mutually associated network subscribers, transmits a synchronization signal to all network subscribers which are positioned in the transmission and/or reception range of the transmitting network subscriber. After an acknowledgement of the synchronization signal, which is typically a synchronization bit sequence known to all network subscribers of the ad-hoc network, a cluster of network subscribers is generated by the network subscribers disposed in a direct transmission connection with the transmitting network subscriber. Identification features of the respective network subscribers are also typically exchanged with the transmission of the synchronization signal and the associated acknowledgement, if these are necessary for the formation of a cluster of network subscribers.

According to method step S20, the first time synchronization of all network subscribers within each cluster of network subscribers has already been implemented with the generation of individual clusters of respective, regionally adjacent network subscribers in a mobile ad-hoc network 100. Since the topology in a mobile ad-hoc network 100, and accordingly the position of the individual network subscribers, can change continuously, in accordance with one embodiment, a repeated time synchronization of all network subscribers within one cluster may be implemented according to method step S20.

Figure 5:
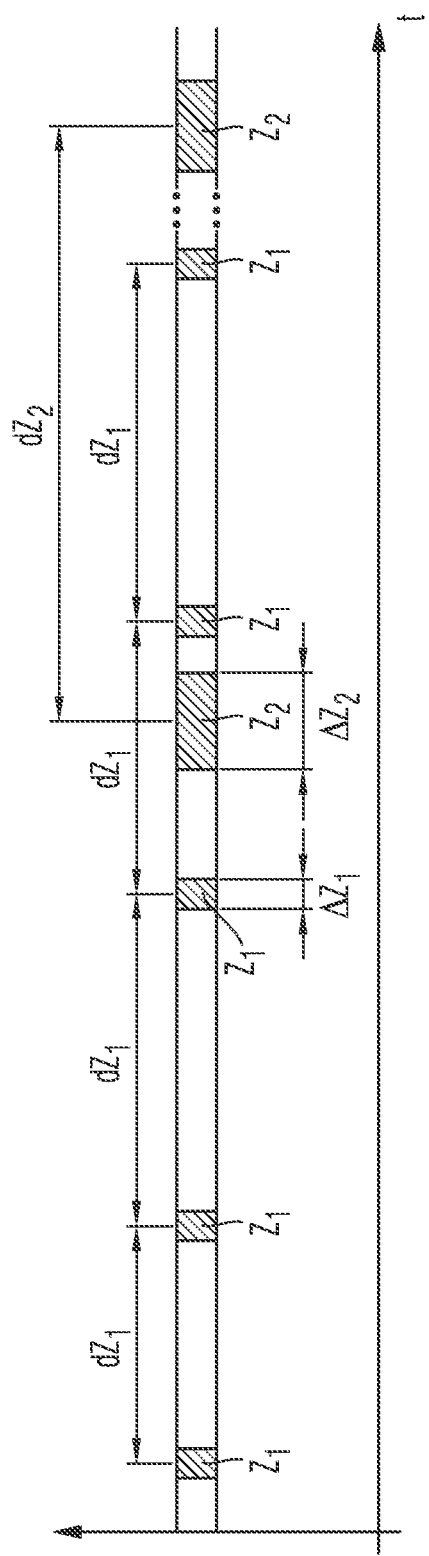
FIG. 5 a time flow diagram showing first and second time intervals, in accordance with an example embodiment of the present invention.

By way of example, this time synchronization may be implemented as shown in FIG. 5 in individual, first time intervals Z 1 with a minimum duration $\Delta Z$ 1, which are spaced in time spacings dZ 1 statistically fluctuating relative to one another in order to minimize any disturbance of the time synchronization by an unauthorized third party. If the composition of a cluster in each case comprising regionally adjacent network subscribers does not change over a relatively long period, the time synchronization to be implemented in successive first time spacings dZ 1 can be suspended in order to achieve optimized transmission efficiency in the ad-hoc newtork.

Alongside this time synchronization within the individual clusters or groupings of the ad-hoc network—a so-called intra-time-synchronization—a time synchronization between the individual clusters or groupings of the ad-hoc network—a so-called inter-time-synchronization—may also be implemented in order to guarantee a time synchronicity between all network subscribers of the ad-hoc network 100. A detailed description of the inter-time-synchronization will not be given at this point, because it is not substantial to the actual concept of the invention. The inter-time-synchronization is presupposed per se and can be found, for example in WO 2011/154911 A1, the disclosure of which is included herein by reference.

In the next method step S30, in each cluster 30, 40, 50, 60, 70 and 80 formed of respective, regionally adjacent network subscribers, one network subscriber is selected, which is positioned at the periphery of the respective cluster, and potential network subscribers for integration into the home cluster are identified. For example, in the cluster 70 of FIG. 1, network subscribers 6, 7 and 8 are selected as network subscribers which are responsible for identifying network subscribers to be integrated. Once again, in order to prevent any disturbance of the integration of new network subscribers into existing time-synchronized clusters of network subscribers and accordingly into the time-synchronized ad-hoc network as far as possible, by way of example, the identification processes to be implemented respectively in successive first time intervals Z1 are implemented in each case by another selected network subscriber of the respective time-synchronized cluster.

The value of the identification number of the respective network subscriber in the ad-hoc network is used, for example, for the sequence in which network subscribers positioned at the periphery of the respective clusters are selected according to the invention. Other criteria for the sequence in which network subscribers at the periphery of the respective cluster are selected for the identification of network subscribers to be integrated can also be used as an alternative and are also covered by embodiments of the invention.

In addition or as an alternative to the criterion of position at the periphery of a respective cluster for selecting the network subscriber for the identification of network subscribers to be integrated, network subscribers which are positioned within the transmission and/or reception range of a maximum of a previously specified number of network subscribers associated with another cluster of the ad-hoc network may preferably be selected. By way of example, those network subscribers should ideally be selected for an identification of network subscribers to be integrated which are positioned outside the transmission and/or reception range of every network subscriber of all other clusters of the ad-hoc network. In this manner, it is more probable that such a selected network subscriber identifies network subscribers to be integrated into its cluster which do not already belong to another cluster of the ad-hoc network.

In the next method step S40, the identification of network subscribers to be integrated in a respective cluster of the ad-hoc network 100 is implemented by a selected network subscriber of the respective cluster.

In a first variant of the described example embodiments, the initiative of identifying network subscribers to be integrated in a cluster of the ad-hoc network is taken by the network subscriber selected in the respective cluster. For this purpose, the selected network subscriber transmits, within a second time interval, information searching for a network subscriber to be integrated.

By way of example, the fixed time spacings dZ2 between the individual second time intervals Z2 and the fixed durations ΔZ2 of the individual second time intervals Z2 according to FIG. 5 may be specified in advance by the ad-hoc network 100 and communicated to the individual network subscribers of the ad-hoc network 100. In this context, the time spacings dZ2 between the individual second time intervals Z2 are dimensioned to be significantly longer than the time spacings dZ1 between the individual first time intervals Z1, since the duration ΔZ2 of a second time interval Z2 by comparison with the duration ΔZ1 of a first time interval Z1 should be dimensioned to be significantly longer, and accordingly, the transmission efficiency in the ad-hoc network 100 is held at a reasonable level.

Individual network subscribers, which are not yet time-synchronized with the ad-hoc network 100 and are positioned within the transmission and/or reception range of the selected network subscriber (the individual network subscriber 21 is disposed within the transmission and/or reception range of the selected network subscriber 7 illustrated with dotted lines in FIG. 2A), or network subscribers, which belong to a cluster of mutually time-synchronized network subscribers which is not yet time-synchronized with the ad-hoc network 100, and are positioned within the transmission and/or reception range of the selected network subscriber (the network subscriber 21, which is associated with the cluster of mutually time-synchronized network subscribers 21, 22 and 23, is disposed within the transmission and/or reception range of the selected network subscriber 7 illustrated with a dotted line in FIG. 3A) acknowledge the received information searching for a network subscriber to be integrated within the second time interval Z2. With the reception of the acknowledgement, the identification of network subscribers to be integrated into the respective cluster by the network subscriber selected in the respective cluster is substantially completed. Together with the acknowledgement of the information searching for a network subscriber to be integrated, the network subscriber selected in the respective cluster receives identification data of the network subscriber to be integrated.

In a second variant of the described example embodiments, the initiative of identifying network subscribers to be integrated in a cluster of the ad-hoc network is taken by the individual network subscriber which is not yet integrated in a cluster of network subscribers of the time-synchronized ad-hoc network 100 and intends to integrate, or by a network subscriber which is associated with a cluster of mutually time-synchronized network subscribers which is not yet associated with a cluster of network subscribers of the time-synchronized ad-hoc network 100 or not yet time-synchronized with the ad-hoc network 100 and intends to integrate. The individual network subscriber intending to integrate or the network subscriber associated with a cluster of time-synchronized network subscribers intending to integrate, which is/are positioned respectively within the transmission and/or reception range of a selected network subscriber in a cluster time-synchronized with the ad-hoc network, each transmit/s information searching for a time-synchronized cluster within a second time interval Z2.

The identification of an individual network subscriber or of a cluster of mutually time-synchronized network subscribers to be integrated into a cluster in each case of regionally adjacent network subscribers time-synchronized with the ad-hoc network is concluded with the reception of the information searching for a time-synchronized cluster and the transmission of an acknowledgement of this information by the selected network subscriber of a cluster time-synchronized with the ad-hoc network. Together with the reception of the information searching for a time-synchronized cluster, the respectively selected network subscriber additionally receives identification data regarding the network subscriber to be integrated, while the network subscribers to be integrated receive identification data of the network subscribers already contained in the respective cluster together with the acknowledgement of the information.

In the next method step S50, an appropriate division of the clusters of network subscribers enlarged by the integration of at least one network subscriber is optionally implemented if no individual network subscriber is identifiable in a cluster of network subscribers modified in this manner which provides a direct transmission connection to all of the other network subscribers of such a modified cluster of network subscribers. This division of a cluster of network subscribers formed in this manner is necessary, since a time synchronization of all network subscribers in a cluster of network subscribers formed in this manner is not possible. In dividing such a cluster of network subscribers, clusters of network subscribers must therefore be formed, which, in each case, contain at least one network subscriber which provides a direct transmission connection with all of the other network subscribers of the divided cluster of network subscribers.

By way of example, the cluster 70' of network subscribers illustrated in FIG. 2B and the cluster 70" of network subscribers illustrated in FIG. 3B represent examples of clusters of network subscribers divided in such a manner, which provide a network subscriber which is disposed in a direct transmission connection with all of the other network subscribers of the divided cluster of network subscribers. In cluster 70' of FIG. 2B, this is network subscriber 7, and in cluster 70" of FIG. 3B, it is network subscriber 21.

In the final method step S60, the network subscribers integrated in the individual divided or undivided clusters of network subscribers are time-synchronized, via a network subscriber which is disposed in a direct transmission connection with all other network subscribers of the respective divided or undivided cluster of network subscribers, with the other network subscribers of the respective divided or undivided cluster of network subscribers through the transmission of information for the time synchronization, preferably a coded synchronization bit sequence.

The invention is not restricted to the embodiments, variants and sub-variants presented. In particular, all combinations of all of the features claimed in the individual claims, all of the features disclosed in the description and all of the features illustrated in the figures of the drawings are also covered by the invention.

The invention claimed is:

1. A method for integrating network subscribers into a time-synchronized ad-hoc network, comprising:
   forming at least one cluster, each comprising a plurality of regionally adjacent network subscribers;
   time synchronizing the network subscribers within each cluster;
   selecting at least one network subscriber at a periphery of a respective one of the clusters in order to identify one or more further network subscribers to be integrated into the respective cluster; and
   time synchronizing the network subscribers of the respective cluster, to which the one or more further network subscribers are to be integrated, with each of the one or more network subscribers to be integrated in the respective cluster; and
   wherein the time synchronization of the network subscribers within each cluster is performed within a first time interval ($Z_1$) of a fixed length ($\Delta Z_1$), which are spaced from one another with a statistically fluctuating time spacing ($dZ_1$).

2. The method according to claim 1, wherein the identification of the one or more further network subscribers to be integrated into the respective cluster is performed repeatedly, in each case with a different selected network subscriber.

3. The method according to claim 1, wherein the selected network subscriber is selected from network subscribers of a cluster that are positioned within a transmission and/or reception range of a previously specified maximum number of network subscribers each associated with another cluster.

4. The method according to claim 1, wherein the selected network subscriber is selected from network subscribers of a cluster which are positioned outside of a transmission and/or reception range of each network subscriber of all other clusters.

5. The method according to claim 1, wherein the time synchronization of the network subscribers within each cluster is performed by a network subscriber of the respective cluster that is positioned in a transmission and/or reception range of all other network subscribers of the respective cluster, and wherein, in a first time interval ($Z_1$), the network subscriber of the respective cluster transmits an information known to all network subscribers of the ad-hoc network for the time synchronization.

6. The method according to claim 1, wherein the time synchronization of the network subscribers within each cluster is omitted if the number of network subscribers in a cluster is not changed.

7. The method according to claim 1, wherein the selected network subscriber transmits an information searching for a network subscriber to be integrated in order to identify at least one network subscriber to be integrated into the respective cluster.

8. The method according to claim 7, wherein a network subscriber that is located in a transmission and/or reception range of the selected network subscriber and intends to integrate itself into the ad-hoc network acknowledges the information searching for a network subscriber to be integrated in order to identify a network subscriber to be integrated into the respective cluster.

9. The method according to claim 8, wherein the transmission of the information searching for a network subscriber to be integrated, the information searching for a time-synchronized cluster and the acknowledgement is performed within time intervals $Z_2$.

10. The method according to claim 7, wherein a network subscriber that is located in a transmission and/or reception range of the selected network subscriber, and belongs to a cluster of network subscribers that are synchronized with one another and intend to integrate themselves into the ad-hoc network, acknowledges the information searching for a network subscriber to be integrated in order to identify the network subscribers to be integrated into the respective cluster.

11. The method according to claim 1, wherein one of an individual network subscriber and a network subscriber associated with a cluster of mutually synchronized network subscribers, which intend/s to integrate itself or themselves into the ad-hoc network, transmits an information searching for a time-synchronized cluster.

12. The method according to claim 11, wherein a selected network subscriber of a time-synchronized cluster, which is disposed in the transmission and/or reception range of the network subscriber transmitting the information searching for a time-synchronized cluster, acknowledges the information searching for a time-synchronized cluster in order to identify the network subscriber or subscribers to be integrated into the respective cluster.

13. The method according to claim 1, wherein, after the identification of the one or more further network subscribers to be integrated into the respective cluster, each cluster is divided as required into several clusters in order to provide clusters in which at least one network subscriber is available in each case within a transmission and/or reception range of all of the other network subscribers of the cluster.

14. The method according to claim 13, wherein the time synchronization of the network subscribers of each of the at least one cluster, to which the one or more further network subscribers are to be integrated, with each of the one or more network subscribers to be integrated in the respective cluster, which is either undivided or divided, is performed within a first time interval ($Z_1$) following respectively after a second time interval ($Z_2$).

15. An ad-hoc network, comprising:
at least one cluster, each comprising a plurality of regionally adjacent network subscribers, wherein the network subscribers within each cluster are time-synchronized via a synchronization performed within a first time interval ($Z_1$) of a fixed length ($\Delta Z_1$), which are spaced from one another with a statistically fluctuating time spacing ($dZ_1$); and
at least one selected network subscriber located at a periphery of a respective one of the clusters, wherein the at least one selected network subscriber is selected for a determination of one or more further network subscribers to be integrated into the respective cluster; and
wherein the network subscribers of the respective cluster, to which the one or more further network subscribers are to be integrated, are time-synchronized with each of the one or more network subscribers to be integrated in the respective cluster.

16. The ad-hoc network according to claim 15, wherein the selected network subscribers are each positioned within a transmission and/or reception range of a previously specified maximum number of network subscribers each associated with another time-synchronized cluster of the ad-hoc network.

17. The ad-hoc network according to claim 15, wherein the selected network subscribers are each positioned outside of a transmission and/or reception range of each network subscriber of all of the other time-synchronized clusters.

* * * * *